US009001975B2

(12) United States Patent
Tolksdorf

(10) Patent No.: US 9,001,975 B2
(45) Date of Patent: Apr. 7, 2015

(54) CONTACT CENTER RECORDING SERVICE

(71) Applicant: Genesys Telecommunications Laboratories, Inc., Daly City, CA (US)

(72) Inventor: Juergen Tolksdorf, Dortmund (DE)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

(21) Appl. No.: 13/711,480

(22) Filed: Dec. 11, 2012

(65) Prior Publication Data

US 2014/0161237 A1    Jun. 12, 2014

(51) Int. Cl.
*H04M 1/64* (2006.01)
*H04M 3/493* (2006.01)
*H04M 3/527* (2006.01)
*H04M 3/53* (2006.01)

(52) U.S. Cl.
CPC .............. *H04M 3/493* (2013.01); *H04M 3/527* (2013.01); *H04M 3/5307* (2013.01)

(58) Field of Classification Search
CPC .......... H04M 3/5175; H04M 3/42221; H04M 15/06; H04M 15/04; H04M 11/045; H04M 3/4876; H04M 1/6515; H04M 15/38; H04M 19/041
USPC ......... 379/9.08, 41, 51, 68, 71, 88.26, 73, 80, 379/116, 373.04
See application file for complete search history.

(56) References Cited

U.S. PATENT DOCUMENTS

| 5,937,051 | A | 8/1999 | Hurd et al. |
| 7,142,650 | B1* | 11/2006 | Kult et al. ................ 379/112.01 |
| 7,649,877 | B2 | 1/2010 | Vieri et al. |
| 7,701,925 | B1 | 4/2010 | Mason et al. |
| 7,929,516 | B2* | 4/2011 | Darland et al. ............... 370/352 |
| 8,265,261 | B1* | 9/2012 | Adamson et al. ........ 379/265.02 |
| 8,315,875 | B2 | 11/2012 | Burns et al. |
| 8,352,277 | B2* | 1/2013 | Bennett ..................... 704/270.1 |
| 2002/0110113 | A1 | 8/2002 | Wengrovitz |
| 2005/0131706 | A1* | 6/2005 | Teunen et al. ................. 704/273 |
| 2010/0158236 | A1 | 6/2010 | Chang et al. |
| 2011/0029637 | A1 | 2/2011 | Morse |
| 2011/0130119 | A1* | 6/2011 | Gupta et al. .................. 455/411 |
| 2011/0299670 | A1* | 12/2011 | Krause ....................... 379/88.13 |
| 2013/0148794 | A1* | 6/2013 | Phelps et al. .............. 379/88.04 |

FOREIGN PATENT DOCUMENTS

KR    10-2003-0012683 A    2/2003
WO    WO 01/06489 A1    1/2001

OTHER PUBLICATIONS

Written Opinion and International Search Report for PCT/US2013/073750, mailed on Mar. 26, 2014, 13 pages.

* cited by examiner

*Primary Examiner* — Akelaw Teshale
(74) *Attorney, Agent, or Firm* — Christie, Parker & Hale, LLP

(57) ABSTRACT

A system and method for producing audio messages for use in a contact center. A customer may specify message content, and provide a voice specification, which may identify a preferred voice artist and other aspects of the audio message including the language, accent and tone of the message. The service may produce the recording and provide it to the customer.

28 Claims, 4 Drawing Sheets

CONTACT CENTER RECORDING SERVICE

FIELD

The following description relates to contact center support services and more particularly to a service and method for producing audio messages for use in a contact center.

BACKGROUND

Contact centers may be used by an organization to communicate in an efficient and systematic manner with outside parties. Such centers may for example have large numbers of agents staffing telephones, and interacting with outside parties and with each other. Calls may be placed on hold or into an interactive voice response (IVR) system when first connected to the contact center; subsequently an agent may take a call, place it back on hold, transfer the call, conference in another agent, or take other such actions related to the call.

An IVR may include a series of pre-recorded greetings, questions, and prompts, which may collectively be referred to as audio messages. Such audio messages may also be used in other automated phone answering systems, such as a system which merely plays an audio message for callers, asking them to call back. It may be desirable to use audio messages that are customized to the organization operating the IVR or other automated phone answering system, including, for example the name of the organization, or, in the case of an IVR, customized options tailored to the organization's operations.

It may be difficult, inconvenient, or inefficient for some organizations to create audio messages of acceptable quality. An organization may lack a suitable audio studio and recording equipment of acceptable quality, and it may lack access to suitable voice talent, e.g., voice artists capable of speaking with the necessary voice attributes, such as, for example, a professional tone, a friendly tone, or a suitable accent in a foreign language. Arranging for access to a recording studio and voice talent may be expensive and inefficient for an organization lacking experience in work of this type.

In another case, if an organization has the capability to produce audio messages of acceptable quality, there may be a further difficulty in the use of these messages. If, for example, they are to be employed in a contact center operated by another entity, there may be a risk that a digital audio file used to transmit the audio messages may have malicious content. Thus, there is a need for a service for creating safe audio messages for automated phone answering systems.

SUMMARY

An aspect of an exemplary embodiment of the present invention is directed toward a service for producing and providing audio messages to customers for whom creating such messages may be difficult or inconvenient.

According to an embodiment of the present invention there is provided a system, including: a remote message specification receiver, configured to receive a message specification including: message content; and a voice specification; and a remote recording apparatus.

In one embodiment, the system includes a remote audio message sender for sending an audio message to a customer.

In one embodiment, the voice specification includes a voice artist identifier.

In one embodiment, the voice specification includes a character identifier.

In one embodiment, the voice specification includes a language identifier.

In one embodiment, the voice specification includes an accent identifier.

In one embodiment, the voice specification includes a context specification.

In one embodiment, the message specification receiver is configured to receive a message specification further including a supplemental component specification.

In one embodiment, the supplemental component specification includes a video specification.

In one embodiment, the supplemental component specification includes a music specification.

In one embodiment, the message content is in a digital audio file.

In one embodiment, the message specification receiver includes a filter with a demilitarized zone.

The demilitarized zone may include: an audio player; an audio channel; and an audio recorder.

The audio channel may include a loudspeaker and a microphone.

In one embodiment, the system further includes: a remote operational database; a remote invoice generator; and a remote payment reconciliation and reporting system.

According to an embodiment of the present invention there is provided a method, including: receiving, by a remote message specification receiver, a message specification; identifying, based on the message specification, a suitable voice artist; recording an audio message; and sending the audio message.

In one embodiment, the message specification includes message content and a voice specification.

In one embodiment, the receiving, by the message specification receiver, of the message specification, includes filtering, by a demilitarized zone, of the message content.

In one embodiment, the filtering, by the demilitarized zone, of the message content, includes: playing, by an audio player having an output, of the message content; transmitting, by an audio channel, of the output of the audio player to an audio recorder; and recording, by the audio recorder, of the message content.

In one embodiment, the voice specification includes a language identifier.

In one embodiment, the voice specification includes an accent identifier.

In one embodiment, the receiving, by the message specification receiver, of the message specification, includes recommending, by an expert system, of an aspect of the voice specification.

In one embodiment, the recommending, by an expert system, of an aspect of the voice specification, includes recommending a tone for the audio message.

In one embodiment, the message specification includes a supplemental component specification.

In one embodiment, the method includes obtaining, for a customer, rights to intellectual property included in the audio message.

In one embodiment, the method includes invoicing a customer.

In one embodiment, the method includes reconciling a payment received with an amount owed by a customer.

In one embodiment, the method includes generating a financial report.

According to an embodiment of the present invention there is provided a method, including: receiving, by a remote message specification receiver, a plurality of message specifications; identifying, based on the plurality of message specifications, a plurality of suitable voice artists; recording a plurality of audio messages; and sending the audio messages, wherein the receiving, by the remote message specification receiver, of a plurality of message specifications includes recommending, by an expert system, of a voice artist identifier and a character identifier, for each of the plurality of message specifications.

BRIEF DESCRIPTION OF THE DRAWINGS

These and other features and advantages of the present invention will become appreciated as the same become better understood with reference to the specification, claims and appended drawings wherein:

DETAILED DESCRIPTION

The detailed description set forth below in connection with the appended drawings is intended as a description of exemplary embodiments of a contact center recording service provided in accordance with the present invention and is not intended to represent the only forms in which the present invention may be constructed or utilized. The description sets forth the features of the present invention in connection with the illustrated exemplary embodiments. It is to be understood, however, that the same or equivalent functions and structures may be accomplished by different exemplary embodiments that are also intended to be encompassed within the spirit and scope of the invention. As denoted elsewhere herein, like element numbers are intended to indicate like elements or features.

Figure 1:
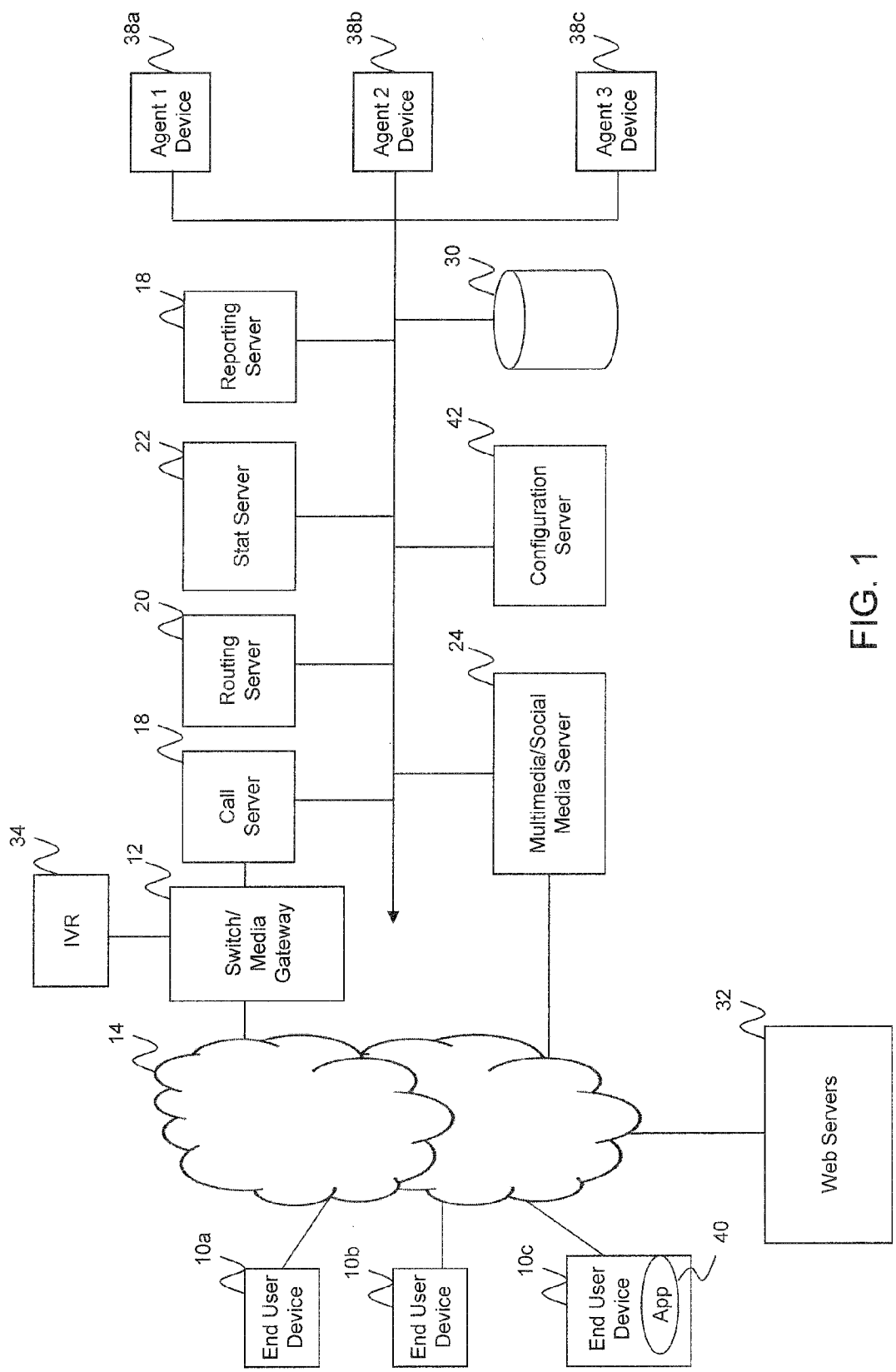
FIG. 1 is a block diagram of elements in an exemplary contact center according to an exemplary embodiment of the present invention.

FIG. 1 is a schematic block diagram of a system supporting a contact center according to one exemplary embodiment of the invention. The contact center may be an in-house facility to a business or corporation for serving the enterprise in performing the functions of sales and service relative to the products and services available through the enterprise. In another exemplary embodiment, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as end users) desiring to receive services from the contact center may initiate inbound calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. The mechanisms of contact in a call, and the corresponding user devices 10, need not be limited to real-time voice communications as in a traditional telephone call, but may be non-voice communications including text, video, and the like, and may include email or other non-real-time means of communication. Thus the term "call" as used herein is not limited to a traditional telephone call but is a generalized term including any form of communication in which a contact center may participate.

Inbound and outbound calls from and to the end user devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls and/or data between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch/media gateway 12 and the remainder of the routing, monitoring, and other call-handling systems of the contact center.

The contact center may also include a multimedia/social media server 24, which may also be referred to as an interaction server, for engaging in media interactions other than voice interactions with the end user devices 10 and/or web servers 32. The media interactions may be related, for example, to email, chat, text-messaging, web, social media, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch is coupled to an interactive voice response system (IVR) 34. IVR is a technology that allows a computer to interact with humans through the use of voice and dual-tone multi-frequency (DTMF) tones input via keypad. In telecommunications, IVR allows customers to interact with a company's host system via a telephone keypad or by speech recognition, after which they can service their own inquiries by following the IVR dialogue. IVR systems can respond with prerecorded or dynamically generated audio to further direct users on how to proceed. IVR applications can be used to control almost any function where the interface can be broken down into a series of simple interactions. The IVR 34 may be configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

In one exemplary embodiment, an IVR may include: an IVR server with control logic for selecting prompts or information to provide to a caller, based in some cases on responses received from the caller; and a media server which may store audio messages. Such a media server may also store other media, such as video, music, still images, or text. In one exemplary embodiment the media server may be a separate entity in the contact center and shared by the IVR and other servers, or the contact center may include one or more further media servers, in addition to one shared or owned by the IVR.

If the call is to be routed to an agent, the call is forwarded to the call server 18 which interacts with a routing server 20 for finding the most appropriate agent for processing the call. The call server 18 may be configured to process PSTN calls, VoIP calls, and the like. For example, the call server 18 may include a session initiation protocol (SIP) server for processing SIP calls. In another exemplary embodiment, the call server may include a telephony server (T-server).

In one example, while an agent is being located and until such agent becomes available, the call server may place the call in a call queue. The call queue may be implemented via any data structure conventional in the art, such as, for example, a linked list, array, and/or the like. The data structure may be maintained, for example, in buffer memory provided by the call server 18. While a call is in a queue, one or more audio messages may be played for the caller, including for example advertising, an apology that the caller is being asked to wait, or information such as the expected remaining wait time. Music, or, if the call includes more than voice interactions, other media such as video, text, or still images, may also be provided to the caller while the call is in the queue, when the caller receives an initial welcome message upon first calling in, or while the caller is interacting with the IVR. Such other media may also be a part of the audio messages. Thus, as used herein, the term audio message is not limited to a message including only spoken voice, but it may include other audio elements such as music, and non-audio elements such as text, images, or video.

Once an appropriate agent is available to handle a call, the call is removed from the call queue and transferred to the corresponding agent device 38a-38c (collectively referenced as 38). Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations. The selection of an appropriate agent for routing an inbound call may be based, for example, on a routing strategy employed by the routing server 20, and further based on information about agent availability, skills, and other routing parameters provided, for example, by a statistics server 22, which may also be referred to as a stat server 22. A person of skill in the art should recognize that the stat server 22 may also be implemented via firmware (e.g. an application-specific integrated circuit), hardware, or a combination of software, firmware, and hardware.

The multimedia/social media server 24 may also be configured to provide, to an end user, a mobile application 40 for downloading onto the end user device 10. The mobile application 40 may provide user configurable settings that indicate, for example, whether the user is available, not available, or availability is unknown, for purposes of being contacted by a contact center agent. The multimedia/social media server 24 may monitor the status settings and send updates to the aggregation module each time the status information changes.

The contact center may also include a reporting server 28 configured to generate reports from data aggregated by the stat server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

To store configuration information such as device characteristics and agent attributes, such as agent skill levels, a configuration server 42 may be included in the system. The configuration server 42 may, for example, provide attribute values for objects or processes when these are created, at system startup, or subsequently.

According to one exemplary embodiment of the invention, the contact center also includes a mass storage device 30 for storing data related to contact center operations such as, for example, information related to agents, customers, customer interactions, and the like. The mass storage device may take the form of a hard disk or disk array as is conventional in the art.

Each of the various servers of FIG. 1 may include one or more processors executing computer program instructions and interacting with other system components for performing the various functionalities described herein. The computer program instructions are stored in a memory which may be implemented in the server using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the exemplary embodiments of the present invention.

Figure 2:
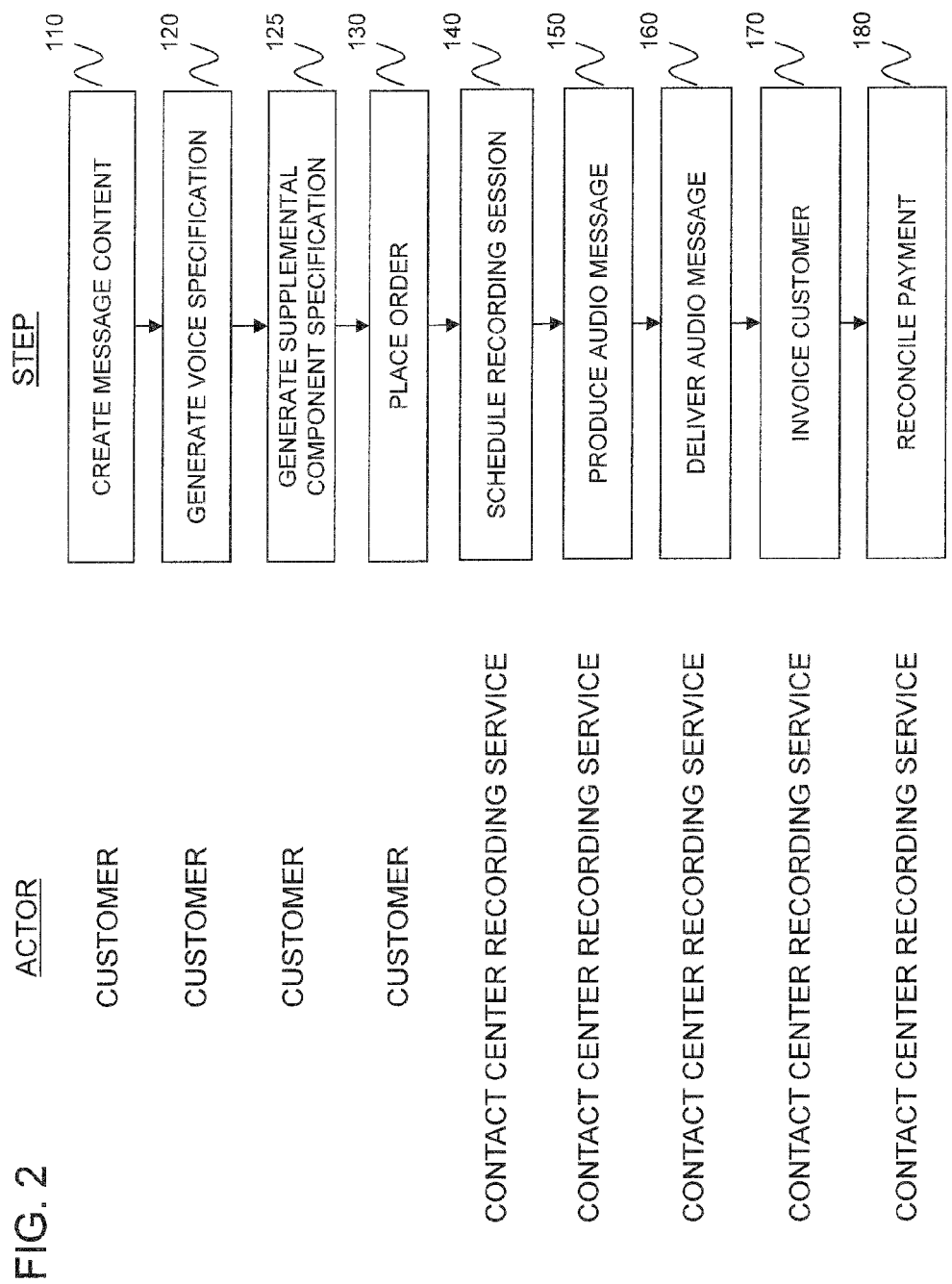
FIG. 2 is a flow chart showing acts related to the creation of an audio message according to an exemplary embodiment of the present invention.
Figure 3:
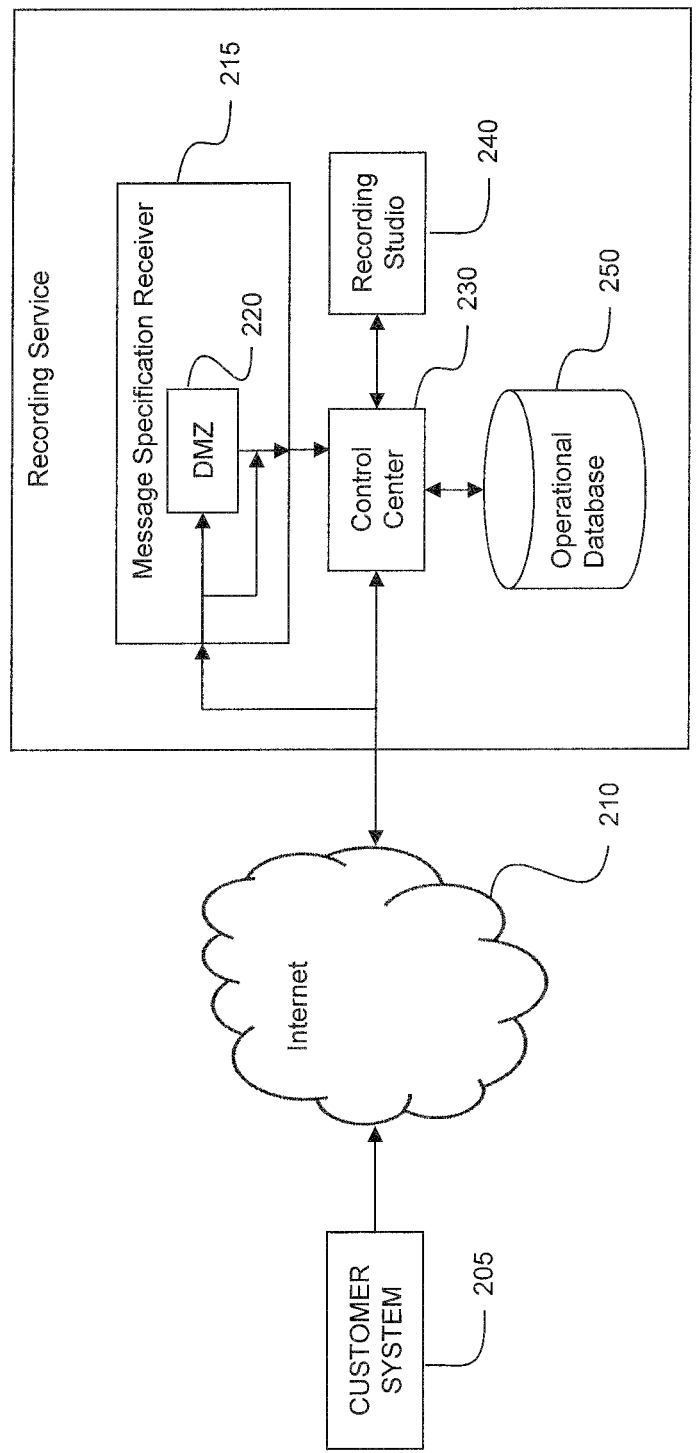
FIG. 3 is a block diagram including elements of a contact center recording service according to an exemplary embodiment of the present invention.

Referring to FIG. 2, according to an exemplary embodiment of the present invention, a customer of a contact center recording service may begin the process of purchasing an audio message by, in a first act 110, creating content for the message. Such message content may be composed, for example, of the words "Thank you for calling ABC Corporation. For sales, press 1, for customer service press 2, or remain on the line for an operator." The customer may document the message content by typing it into a file or email or short message service (SMS) text message, or by speaking the words and recording them in a digital audio file. The customer may then send the message content to the contact center recording service, for example via the internet 210 (FIG. 3).

Accompanying the message content may be other information, generated in an act 120, which may be referred to as a voice specification, and which specifies other voice attributes of the audio message, and indicates how the audio message is to be generated from the message content. The voice specification may include a voice artist identifier to identify a particular voice artist. A voice artist may have a repertoire of characters that she or he is able to represent, which may be identified by a character identifier, such as Banker, Salesperson, Receptionist, Diplomat, or the like, and in such an exemplary embodiment, the voice specification may also include a character identifier. In one exemplary embodiment, the contact center recording service may offer to customers a list of characters and voice artists employed by the service may be asked to become proficient in speaking as one or more of these characters. The voice specification may also contain an accent identifier and a language identifier specifying the accent and the language respectively, e.g., British English, or American English, or the like. The voice specification may also contain specifications for the speed and pitch of the speech, and a tone identifier specifying the tone of the voice, e.g., professional, deferential, enthusiastic, or reassuring.

The voice specification may also include a context specification indicating, for example, whether a message is a statement, or a question, or a fragment of a question. If the audio message is a single word or a phrase intended to be combined with other words when played to the caller, then having the message spoken with the correct intonation may be important. For example, the word "hold" may be spoken with a rising intonation if it is to be made part of a question, e.g., "Would you like to hold?" and with a flat, or constant, intonation if is to be made part of a statement, such as "Your estimated hold time is three minutes." The context specification may thus provide pronunciation guidance to the voice artist.

In one exemplary embodiment, samples of audio recordings may be made available to customers, who may request an audio message resembling one of the samples. In another exemplary embodiment, it may be possible for a customer to specify combinations of attributes from several samples, by, for example requesting the voice artist, accent, and language of sample A, and the tone of sample B. The contact center recording service may also make it possible for customers to request a voice resembling a well-known voice, such as that of a well-known politician or movie actor.

In one exemplary embodiment, the contact center recording service has agreements with people with well-known voices and provides audio messages using such voices, or imitations of them by voice actors, or synthesized imitations or reproductions. In another exemplary embodiment, the contact center recording service coordinates, between a customer and a person with a well-known voice, the process of obtaining the right to use the voice. The use of a well-known voice in an audio message, or in a series of audio messages changed occasionally, may provide entertainment to fans who enjoy hearing the message, or motivate them to call periodically to listen to the most recent message. Similarly, the contact center recording service may provide the service of obtaining, for a customer, rights to intellectual property, such as music, graphics, or video, included in an audio message.

In one exemplary embodiment, the contact center recording service may include an expert system to help a customer generate a voice specification. This system may, for example, take into account the customer's location, the customer's business, and attributes, such as typical educational level, or median income, of the customer's callers, and make recommendation about certain aspects of the voice specification. The expert system may recommend, for example, for a customer operating a bank, with callers with moderate incomes, a voice specification that specifies a professional tone.

The expert system may also recommend combinations of voices, so that a caller may, for example, be welcomed by one voice, and be presented with a set of menu options by a second voice. This may, according to a technique known in the art as gamification, provide a more pleasant or entertaining experience for the caller. The expert system may also make conditional recommendations, recommending for example a friendly, cheerful voice for use in a welcome message, and a more professional, deferential voice for use in a message to be played for customers calling with complaints.

In an act 125, the customer may generate a specification for other components of the audio message, referred to herein as supplemental components of the audio message. These may include music, graphics, or video to be included in the audio message. The specification for the supplemental components of the audio message may be referred to as a supplemental component specification, and its parts may, for example, include a video specification, a music specification, or an image specification, specifying, respectively, video, music, and one or more images to be included in the audio message.

In an act 130, the customer may place an order for an audio message, by submitting to the contact center recording service the message content, the voice specification, and, optionally, a supplemental component specification, a combination which may be referred to as a message specification. The message content may be submitted to the contact center recording service by a number of methods, including paper correspondence, or electronic ways including email or upload to a server. The contact center recording service may include a remote message specification receiver 215 for receiving the message specification and for performing initial routing of the message content and the voice specification. In the case of electronic submission of the message content in the form of a digital audio file, the possibility that such an electronic submission may have malicious content may be a concern. In this case the remote message specification receiver 215 may route the message specification, or portions of it, such as the message content, through a filter or firewall referred to as a sandbox or including a demilitarized zone (DMZ) 220 (FIG. 3) to filter the message content so as to reduce the security risk inherent in direct electronic submissions.

In one exemplary embodiment, the contact center recording service may include a remote recording studio 240 (FIG. 3) that is remote from the customer (the customer system). Such a recording studio 240 may include one or more rooms with favorable acoustic qualities, and it may include a recording apparatus for capturing words spoken by a voice artist, and preserving the resulting sound, for example in a digital audio file. The voice message in this digital audio file may be the final voice message, or further production acts, such as changing the speed or the pitch of the speech, or applying a filter to remove noise, may be applied, to generate the final audio message.

Once an order has been received, the contact center recording service may, in an act 140, schedule a voice artist for a studio session to record the one or more audio messages ordered by the customer. In another exemplary embodiment, the contact center recording service may not include a recording studio 240 and it may instead make arrangements with other parties which operate recording studios. In an alternate embodiment, the contact center recording service may use machine-synthesized voice, making the act 140 unnecessary.

Once the audio message or audio messages ordered by a customer have been produced, in an act 150 which may include recording and other production steps, they may be delivered, in an act 160, to the customer, via email or as an attachment to an SMS message or by some other ways, such as making the digital audio files containing the audio messages available for download. Payment from the customer may be processed before or after the audio messages have been recorded or delivered, and in one exemplary embodiment receipt of payment may be a precondition to scheduling a recording session with a voice artist or to delivering the audio messages to the customer. In one exemplary embodiment the customer may be invoiced, in an act 170, and after payment is received, the contact center recording service may, in an act 180, reconcile the payment with amounts owed.

Referring to FIG. 3, the operations of the contact center recording service may be managed by a remote control center 230 that is remote from a customer system 205 (or a customer's facility). In one exemplary embodiment, the contact center of FIG. 1 may be part of the customer system 205, or the contact center may also be remote from the customer system 205, which may for example include corporate headquarters; in this case the contact center and contact center recording service may be co-located. According to an exemplary embodiment of the present invention, certain of the functions of the control center 230, such as those of requesting, receiving, and paying for an audio message may be automated to reduce cost and improve reliability. For example the contact center recording service may be operated as a cloud offering, in which a web page may be used by a customer to enter aspects of the voice specification, and to upload message content. The customer may also provide, using the same interface, payment information such as credit card information, or billing information such as a physical address or email address to which an invoice may later be sent.

Sending of invoices may be automated using an invoice generator connected to email or to a suitable facility for printing and mailing paper invoices. Reconciliation of payments received may similarly be automated by a payment reconciliation system with access to information on payments owed and on payments received. Such a system may also include a reporting system which may automatically generate periodic financial reports summarizing the products delivered, charges invoiced, and payments received. In one exemplary embodiment, the data used in the operations of the contact center recording service, including for example customer names, audio message delivery information, payment information, voice artist names and contact information, scheduling information, order queues, and accounting information, may be stored in an operational database 250.

Figure 4:
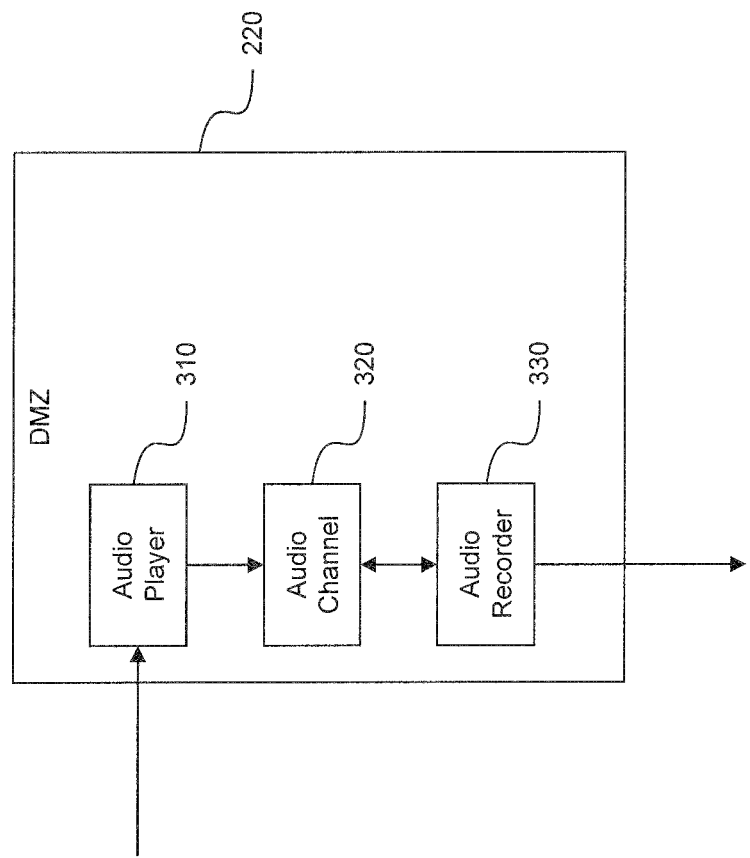
FIG. 4 is a block diagram of a demilitarized zone according to an exemplary embodiment of the present invention.

Referring to FIG. 4, a DMZ 220 (FIG. 3) may include, for example, an audio player 310, an audio channel 320, and an audio recorder 330. The operator may configure the audio player 310 to receive and play an electronically submitted audio file, and the audio recorder 330 in the DMZ 220 may capture the audio and encode it into a new digital audio file. The transmission of the audio signal from the audio player 310 to the audio recorder 330 may occur over an analog signal channel such as pair of wires carrying a voltage representing the analog signal, or an air gap across which the signal is transmitted as an acoustic signal between a loudspeaker and a microphone. In the event that the submitted digital audio file has malicious content, the audio player 310 may be compromised, possibly causing it to generate incorrect audio output, but other elements of the contact center recording service may remain safe. In one exemplary embodiment the audio player 310 may be a low-cost system in the sense that restoring it to full functionality after being compromised may not result in significant cost. In another exemplary embodiment the audio player 310 in the DMZ 220 may be a process configured by the operating system to have closely circumscribed privileges, and prevented, for example, from accessing input or output (I/O) channels other than the audio output channel allocated to it, and from requesting or receiving additional allocations of system memory. In particular, the DMZ 220 may make it less likely that critically sensitive information in the contact center recording service, including information identifying customers, or customer payment information, may be compromised.

Although exemplary embodiments of a contact center recording service have been specifically described and illustrated herein, many modifications and variations will be apparent to those skilled in the art. Accordingly, it is to be understood that the contact center recording service constructed according to principles of this invention may be embodied other than as specifically described herein. The invention is also defined in the following claims, and equivalents thereof.

What is claimed is:

1. A system, comprising:
a processor; and
a memory, wherein the memory includes instructions that, when executed by the processor, cause the processor to:
receive, over a wide area network, a file containing message content, and a voice specification indicative of how the message content is to be recorded into an audio file;
check the message content for malicious data;
in response to determining that the message content does not contain malicious data, transmit a command for generating an audio recording of the message content based on the received voice specification; and
deliver the audio recording over the wide area network, wherein the audio recording is accessible to an interactive voice response system for interacting with customers contacting a customer contact center.

2. The system of claim 1, wherein the voice specification comprises a voice artist identifier.

3. The system of claim 1, wherein the voice specification comprises a character identifier.

4. The system of claim 1, wherein the voice specification comprises a language identifier.

5. The system of claim 1, wherein the voice specification comprises an accent identifier.

6. The system of claim 1, wherein the voice specification comprises a context specification.

7. The system of claim 1 wherein the instructions further cause the processor to:
receive over the wide area network, a supplemental component specification.

8. The system of claim 7, wherein the supplemental component specification comprises a video specification.

9. The system of claim 7, wherein the supplemental component specification comprises a music specification.

10. The system of claim 1, wherein the message content is in a digital audio file.

11. The system of claim 10, wherein the instructions that cause the processor to check the message content for malicious data includes instructions that invoke a filter for performing the check.

12. The system of claim 11, wherein the file containing the message content is an audio file, wherein the filter includes:
an audio player configured to play the message content;
an audio channel configured to receive the played message content and generate an output in response; and
an audio recorder configured to generate a new recording from the output of the audio channel.

13. The system of claim 12, wherein the audio channel comprises a loudspeaker and a microphone.

14. The system of claim 1, further comprising:
a remote operational database;

a remote invoice generator; and a remote payment reconciliation and reporting system.

15. A method, comprising:

receiving, by a processor, a file containing message content, and a voice specification indicative of how the message content is to be recorded into an audio file;

checking, by the processor, the message content for malicious data;

in response to determining that the message content does not contain malicious data, transmitting, by the processor, a command for generating an audio recording of the message content based on the received voice specification; and delivering, by the processor, the audio recording over the wide area network, wherein the audio recording is accessible to an interactive voice response system for interacting with customers contacting a customer contact center.

16. The method of claim 15, wherein the checking the message for malicious data includes invoking a filter for performing the check.

17. The method of claim 16, wherein the file containing the message content is an audio file, wherein the filter is further configured to:

play the message content;

generate an output in response to playing the message content; and record the generated output.

18. The method of claim 15, wherein the voice specification comprises a language identifier.

19. The method of claim 15, wherein the voice specification comprises an accent identifier.

20. The method of claim 15, further comprises:

recommending, by an expert system, an aspect of the voice specification.

21. The method of claim 20, wherein the recommending, by the expert system, the aspect of the voice specification comprises recommending, by the expert system, a tone for the audio message.

22. The method of claim 15, comprising invoicing the customer contact center for the audio recording.

23. The method of claim 15, comprising reconciling a payment received with an amount owed by the customer contact center.

24. The method of claim 23, comprising generating a financial report.

25. A method, comprising:

receiving, by a processor, a file containing message content;

invoking, by the processor, an expert system for recommending at least a portion of a voice specification indicative of how the message content is to be recorded into an audio file;

transmitting, by the processor, a command for generating an audio recording of the message content based on at least the recommended portion of the voice specification; and delivering, by the processor, the audio recording over the wide area network, wherein the audio recording is accessible to an interactive voice response system for interacting with customers contacting a customer contact center.

26. The method of claim 25, wherein the recommending includes recommending a tone for the audio recording.

27. The method of claim 26, wherein different tones are recommended depending on a type of customer interacting with the customer contact center.

28. The method of claim 26, wherein the recommending includes recommending a voice artist for the audio recording.

* * * * *